United States Patent Office 3,102,125
Patented Aug. 27, 1963

3,102,125
Δ^{5(10)}-PREGNENE COMPOUNDS
Fred A. Kincl and Mercedes Velasco, Mexico City, Mexico, assignors, by mesne assignments, to Syntex Corporation, a corporation of Panama
No Drawing. Filed Feb. 21, 1962, Ser. No. 174,681
Claims priority, application Mexico Sept. 26, 1961
11 Claims. (Cl. 260—397.4)

The present invention relates to certain new cyclopentanophenanthrene derivatives and to a method for the preparation thereof.

More particularly, it relates to methods for preparing Δ^{5(10)}-19-nor-pregnene-3,20-dione and Δ^{5(10)}-19-nor-isopregnen-17β-acyloxy-3,20-dione which compounds are represented by the following formulas:

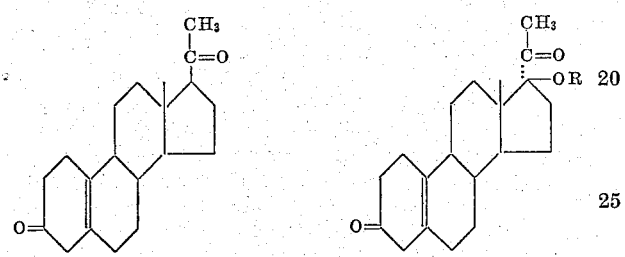

In the above formulas, R represents an acyl group derived from carboxylic acids of up to 12 carbon atoms, saturated or unsaturated, of straight, branched, cyclic or mixed aliphatic-cyclic chain, substituted or not with hydroxyl, methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and β-chloropropionate.

These compounds are powerful progestation agents which exhibits a separation of the progestational and anti-ovulatory activities. They further possess anti-estrogenic and anti-androgenic activity, inhibit the activity of the pituitary gland and favor the excretion of sodium.

For preparing Δ^{5(10)}-19-nor-pregnene-3,20-dione we followed the method illustrated by the following series of reactions:

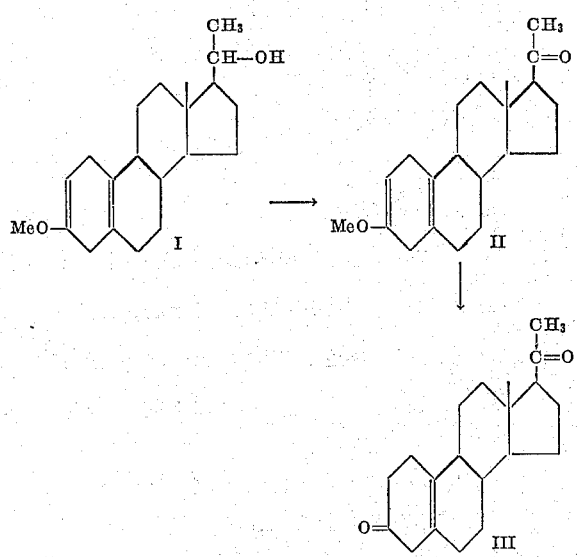

The starting material is 19-nor-3-methoxy-Δ^{2,5(10)}-pregnadien-20-ol (I), described by C. Djerassi et al. in J. Am. Chem. Soc. 75, 4440 (1933), which on oxidation with chromic acid in pyridine or with aluminum isopropoxide (Oppenauer oxidation) produces 19-nor-3-methoxy-Δ^{2,5(10)}-pregnadien-20-one (II). By hydrolysis of this compound under mild acid conditions with dibasic organic acids such as oxalic acid in aqueous methanol solution, at room temperature and for a period of time between 30 and 45 minutes, there is obtained Δ^{5(10)}-19-nor-pregnene-3,20-dione (III).

The method for preparing the esters of Δ^{5(10)}-19-nor-isopregnen-17β-ol-3,20-dione is illustrated by the following series of reactions:

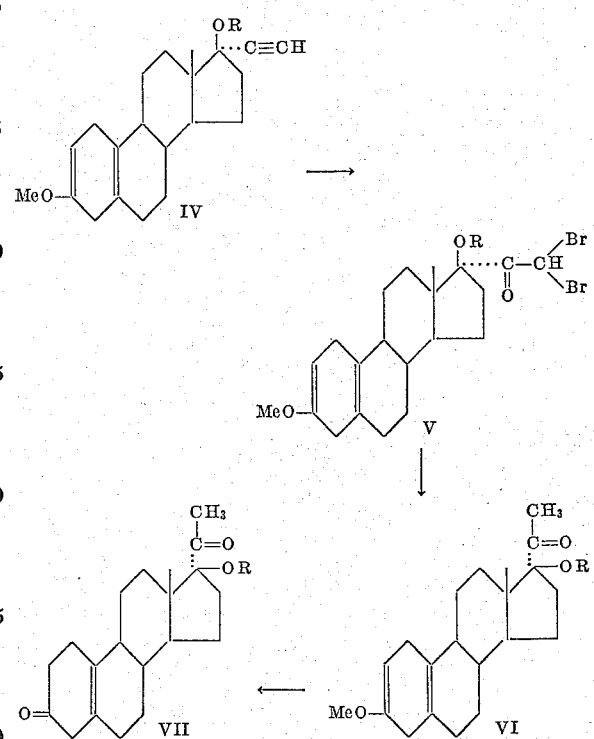

In practicing the process outlined above, an ester of 17α-ethynyl-2-methoxy-Δ^{2,5(10)}-estradien-17β-ol (IV), is treated with a positive halogen, preferably by reaction with an excess of N-bromoacetamide (approximately 3 molar equivalents) in aqueous terbutanol solution to afford the 17α-dibromoacetyl derivative (V). By debrominating the above compound with Raney nickel in methanol, at the reflux temperature and for a period of time between 1 and 4 hours, there are obtained the esters of 3-methoxy-17α-acetyl-Δ^{2,5(10)}-estradien-17β-ol (VI).

Alternatively, the reaction with N-bromoacetamide may be conducted in aqueous acetic acid solution and in the presence of sodium acetate.

The debromination may also be effected by any of the known methods which do not imply acid conditions, in order to avoid the hydrolysis in ring A to the α,β-unsaturated ketone, or strong alkaline conditions which would produce isomerization of the side chain.

Thus for example, such debromination is alternatively carried out by treating the dibromoacetyl compounds (V) with sodium iodide in acetone solution to produce the di-iodoacetyl derivative which upon treatment with sodium bisulfite produces the esters of 3-methoxy-Δ^{2,5(10)}-estradien-17α-acetyl-17β-ol-3-one.

By hydrolysis of these compounds with oxalic acid in aqueous methanol, there are obtained the esters of Δ^{5(10)}-19-nor-isopregnen-17β-ol-3,20-dione (VII).

The following examples serve to illustrate but are not intended to limit the scope of the invention:

PREPARATION I

A mixture of 5 g. of 17α-ethynyl-3-methoxy-Δ^{2,5(10)}- estradien-17β-ol, 40 cc. of pyridine and 10 cc. of acetic anhydride was heated on the steam bath for 8 hours. At the end of this time it was poured into a solution of 10 g. of sodium carbonate in 200 cc. of water; it was extracted with ethyl acetate and the organic extract was well washed with water, dried over anhydrous sodium sulfate and evaporated to dryness under reduced pressure. The residue was crystallized from acetone-hexane, thus affording the acetate of 17α-ethynyl-3-methoxy-$\Delta^{2,5(10)}$-estradien-17β-ol.

In the same manner, but using propionic, caproic, enanthic and cyclopentylpropionic anhydrides, there were obtained the propionate, the caproate, the enanthate and the cyclopentylpropionate of 17α-ethynyl-3-methoxy-$\Delta^{2,5(10)}$-estradien-17β-ol.

*Example I*

A solution of 5 g. of 19-nor-3-methoxy-$\Delta^{2,5(10)}$-pregnadien-20-ol in 100 cc. of pyridine was cautiously added to a mixture of 5 g. of chromic acid and 100 cc. of pyridine, maintaining the temperature between 10 and 15° C. The reaction mixture was allowed to stand at room temperature for 18 hours, diluted with ethyl acetate and filtered through celite. The filtrate was washed several times with water, dried over anhydrous sodium sulfate and evaporated to dryness under vacuum. Crystallization of the residue from acetone-ether furnished 19-nor-3-methoxy-$\Delta^{2,5(10)}$-pregnadien-20-one.

To a solution of 3 g. of the above compound in 250 cc. of methanol was added 3.9 g. of oxalic acid dihydrate dissolved in 50 cc. of water. The resulting mixture was kept at room temperature (25° C.) for 40 minutes, diluted with water and the precipitate formed was collected by filtration. There was thus obtained $\Delta^{5(10)}$-19-nor-pregnene-3,20-dione, which was purified by crystallization from acetone-hexane.

*Example II*

To a stirred solution of 3 g. of the acetate of 17α-ethynyl-3-methoxy-$\Delta^{2,5(10)}$-estradien-17β-ol in a mixture of 75 cc. of terbutanol and 3 cc. of water, there was added at room temperature 3.6 g. of N-bromoacetamide (3 molecular equivalents) and the mixture was stirred for 2 hours further. It was then diluted with water and the precipitate formed was collected, washed with water and dried under vacuum. There was thus obtained the acetate of 17α-dibromoacetyl-3-methoxy-$\Delta^{2,5(10)}$-estradien-17β-ol, which was used for the next step without further purification.

The above dibromoacetyl compound was dissolved in 60 cc. of methanol, treated with 3 g. of Raney nickel and the resulting mixture was refluxed for 2 hours. The solution was filtered through celite, and the filtrate was concentrated until crystallization started, cooled in ice and filtered. There was thus obtained the acetate of 3-methoxy-$\Delta^{2,5(10)}$-estradien-17α-acetyl-17β-ol.

1.5 g. of the above compound was treated with oxalic acid in methanol, in accordance with the method described in the preceding example, to produce the acetate of $\Delta^{5(10)}$-19-nor-isopregnen-17β-ol-3,20-dione.

*Example III*

A mixture of 2 g. of the acetate of 17α-ethynyl-3-methoxy-$\Delta^{2,5(10)}$-estradien-17β-ol, 100 cc. of acetic acid, 2 g. of sodium acetate and 10 cc. of water was treated with 2.4 g. of N-bromoacetamide and the resulting mixture was stirred for 2 hours at room temperature. It was then diluted with water and the precipitate formed was collected by filtration, washed with water and dried under vacuum, thus affording the acetate of 17α-dibromoacetyl-3-methoxy-$\Delta^{2,5(10)}$-androstadien-17β-ol, identical with the product obtained in the preceding example.

*Example IV*

There was repeated the process of Example II, but using as starting compounds the propionate, the caproate, the enanthate and the cyclopentylpropionate of 17α-ethinyl-3-methoxy-$\Delta^{2,5(10)}$-estradien-17β-ol, thus affording as final products the propionate, the caproate, the enanthate and the cyclopentylpropionate of $\Delta^{5(10)}$-19-nor-isopregnen-17β-ol-3,20-dione.

We claim:

1. A process for preparing $\Delta^{5(10)}$-19-nor-pregnene-3,20-dione which comprises oxidizing 19-nor-3-methoxy-$\Delta^{2,5(10)}$-pregnandien-20-ol with chromic acid in pyridine to produce 19-nor-3-methoxy-$\Delta^{2,5(10)}$-pregnadien-20-one and hydrolyzing the latter compound with oxalic acid in aqueous methanol solution.

2. A process for preparing the ester of $\Delta^{5(10)}$-19-nor-isopregnen - 17β - ol - 3,20-dione which comprises reacting the hydrocarbon carboxylic acid ester of up to 12 carbon atoms of 17α-ethynyl-3-methoxy-$\Delta^{2,5(10)}$-estradien-17β-ol with N-bromoacetamide in aqueous terbutanol solution to form the corresponding ester of 17α-dibromoacetyl-3-methoxy-$\Delta^{2,5(10)}$-estradien-17β-ol; debrominating this compound by refluxing with Raney nickel in methanol solution, and hydrolyzing the corresponding ester of 3-methoxy-17α-acetyl-$\Delta^{2,5(10)}$-estradien-17β-ol, thus obtained with oxalic acid in aqueous methanol.

3. A process, in accordance with claim 2, wherein the reaction with N-bromoacetamide is conducted in the presence of sodium acetate, using acetic acid as solvent.

4. A process, in accordance with claim 2, wherein there is employed as starting compound the acetate of 17α-ethynyl-3-methoxy-$\Delta^{2,5(10)}$-estradien-17β-ol, and there is obtained as final product the acetate of $\Delta^{5(10)}$-19-nor-isopregnen-17β-ol-3,20-dione.

5. A process in accordance with claim 2 wherein there is employed as starting compound the acetate of 17α-ethynyl-3-methoxy-$\Delta^{2,5(10)}$-estradien-17β-ol and wherein the reaction with N-bromoacetamide is conducted in the presence of sodium acetate, using acetic acid as solvent and there is obtained as final product the acetate of $\Delta^{5(10)}$-19-nor-isopregnen-17β-ol-3,20-dione.

6. A compound of the following formula:

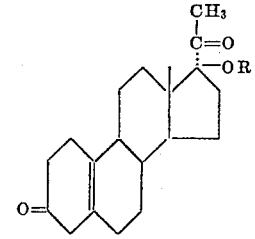

wherein R is a hydrocarbon carboxylic acyl group containing up to 12 carbon atoms.

7. The acetate of $\Delta^{5(10)}$-19-nor-isopregnen-17β-ol-3,20-dione.

8. The propionate of $\Delta^{5(10)}$-19-nor-isopregnen-17β-ol-3,20-dione.

9. The caproate of $\Delta^{5(10)}$-19-nor-isopregnen-17β-ol-3,20-dione.

10. The enanthate of $\Delta^{5(10)}$-19-nor-isopregnen-17β-ol-3,20-dione.

11. The cyclopentylpropionate of $\Delta^{5(10)}$-19-nor-isopregnen-17β-ol-3,20-dione.

References Cited in the file of this patent

UNITED STATES PATENTS 2,729,654   Colton _____ Jan. 3, 1956